(No Model.)
E. KLINK.
MOLE TRAP.
No. 515,233.  Patented Feb. 20, 1894.
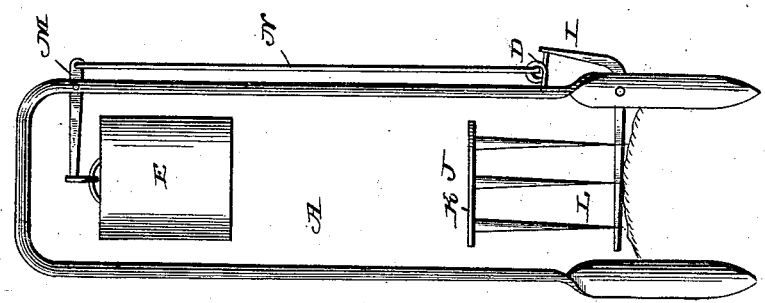
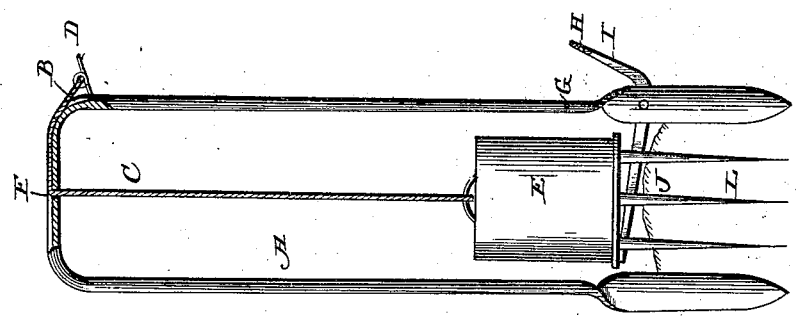
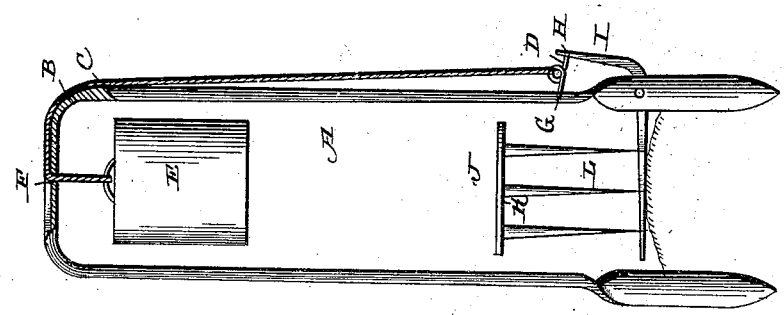

UNITED STATES PATENT OFFICE.

ELI KLINK, OF SALEM, STEUBEN COUNTY, INDIANA.

MOLE-TRAP.

SPECIFICATION forming part of Letters Patent No. 515,233, dated February 20, 1894.

Application filed September 2, 1893. Serial No. 484,607. (No model.)

*To all whom it may concern:*

Be it known that I, ELI KLINK, a citizen of the United States, residing at Salem, in the county of Steuben and State of Indiana, have invented certain new and useful Improvements in Mole-Traps; and I do hereby declare the following to be a full, clear, and exact description of the invention, such as will enable others skilled in the art to which it appertains to make and use the same.

My invention relates to improvements in that class of animal traps known as "impalement traps" and it consists in certain novel features hereinafter described and claimed.

In the accompanying drawings, which fully illustrate my invention, Figure 1 is a view of the trap as it appears before it has been sprung. Fig. 2 is a similar view showing it after it has been sprung and Fig. 3 is a view of a modification.

The supporting frame consists of an inverted U-shaped bar A having its extremities sharpened or pointed so that it may be readily driven into the ground and made to assume and maintain an upright position as will be readily understood. The upper surface of the frame is slightly concave and is provided with a groove B to receive the weight-suspending cord or chain C. This weight-suspending cord C is provided with a trigger or trip pin D at one end and is secured to a weight E at its other end, its intermediate portion playing in the groove B and passing downward through an opening F in the top of the supporting frame at the center of the same. The trip pin D is adapted, when the trap is set, to engage an opening G in the frame and a similar opening H in the end of a trigger or operating lever I which is pivoted on the frame near the lower end of the same. The said trigger consists of an angle lever fulcrumed, near its bend, upon the frame and having its longer arm extending entirely across the frame and its shorter arm projecting up alongside the same. The trap is completed by the use of an impalement plate J which consists of a metallic plate K having a number of spear points or teeth L depending therefrom.

Instead of having the weight secured to a cord passing over the top of the frame, it may be suspended on the inner end of a lever M which is fulcrumed in the side bar of the frame, as shown in Fig. 3, and has its outer end connected with the trip pin by a wire N. This form of the device will operate in the same manner as the arrangement shown in the other figures and may sometimes be preferred.

In practice, the frame is driven into the ground so as to pass over the known path of travel of the mole or other animal. The trip pin is then secured by having its ends engaged in the frame and the trigger, as hereinbefore described. The weight is thus drawn to the top of the frame and the impalement plate is then inserted between the sides or arms of the frame so that when an animal passes beneath the trigger, the pressure of his back will raise the longer arm of the trigger and thereby cause the shorter arm to swing away from the frame and release the trip pin, when the weight will at once fall upon the impalement plate and drive the spear points through the body of the animal.

It will be noticed that the trap is of a cheap and simple construction and is positive and direct in its operation.

Having thus described my invention, what I claim, and desire to secure by Letters Patent, is—

An improved mole trap comprising the following instrumentalities:—An inverted U-shaped frame set in the ground, an impalement plate resting loosely on the ground between the arms of said frame, an L-shaped trigger pivoted at its angle to one arm of said frame, the longer branch of said trigger extending across the frame and the shorter branch thereof projecting upward alongside the arm of the frame, a trip pin having its opposite ends resting freely in openings in the side of the frame and the end of the upturned branch of the trigger, a suspending mechanism extending from the central point of the trip pin to the top of the frame, and a weight held directly over the impalement plate by the suspending mechanism as specified.

In testimony whereof I affix my signature in presence of two witnesses.

ELI KLINK.

Witnesses:
J. C. WOODFORD,
H. M. BUTLER.